(12) United States Patent
Barbieri et al.

(10) Patent No.: US 8,404,188 B2
(45) Date of Patent: Mar. 26, 2013

(54) HEAT EXCHANGE UNIT FOR ISOTHERMAL CHEMICAL REACTORS

(75) Inventors: Agostino Barbieri, Pieranica (IT); Nicola Sorlini, Sovere (IT)

(73) Assignee: Methanol Casale S.A. (CH)

( * ) Notice: Subject to any disclaimer, the term of this patent is extended or adjusted under 35 U.S.C. 154(b) by 52 days.

(21) Appl. No.: 12/669,412

(22) PCT Filed: Jun. 30, 2008

(86) PCT No.: PCT/EP2008/005316
§ 371 (c)(1),
(2), (4) Date: Mar. 30, 2010

(87) PCT Pub. No.: WO2009/010179
PCT Pub. Date: Jan. 22, 2009

(65) Prior Publication Data
US 2010/0189609 A1     Jul. 29, 2010

(30) Foreign Application Priority Data

Jul. 19, 2007  (EP) ..................................... 07014177

(51) Int. Cl.
*B01J 19/00*   (2006.01)
*B01J 8/00*    (2006.01)
*B01J 8/02*    (2006.01)
*B01J 35/02*   (2006.01)
*F28F 3/14*    (2006.01)

(52) U.S. Cl. ........ 422/198; 422/129; 422/187; 422/211; 165/170

(58) Field of Classification Search ................... 422/129, 422/198, 211, 187; 165/145, 157, 170; 423/392
See application file for complete search history.

(56) References Cited

U.S. PATENT DOCUMENTS

| | | | |
|---|---|---|---|
| 5,035,867 A | | 7/1991 | Dang Vu et al. |
| 5,086,837 A | * | 2/1992 | Hagemeister ................. 165/170 |
| 2004/0241060 A1 | * | 12/2004 | Silversand .................... 422/198 |
| 2005/0061490 A1 | | 3/2005 | Filippi et al. |
| 2006/0275190 A1 | | 12/2006 | Filippi |
| 2007/0183963 A1 | | 8/2007 | Seidemann et al. |
| 2007/0274882 A1 | | 11/2007 | Mosler et al. |
| 2008/0135218 A1 | * | 6/2008 | Taniguchi et al. ............ 165/151 |

FOREIGN PATENT DOCUMENTS

| | | |
|---|---|---|
| DE | 914131 C | 6/1954 |
| FR | 784885 A | 7/1935 |
| WO | 94/14021 A1 | 6/1994 |
| WO | 2007/057103 A1 | 5/2007 |

* cited by examiner

*Primary Examiner* — Walter D Griffin
*Assistant Examiner* — Natasha Young
(74) *Attorney, Agent, or Firm* — Akerman Senterfitt

(57) ABSTRACT

Plate heat exchange unit (12) for isothermal or pseudo-isothermal chemical reactors, for the heat exchange between a fluid circulating inside the plates and an outer flow of reactant gases, wherein the walls (14, 15), of the plates (13) have notches (14*s*, 15*s*) surrounded by suitable joining lines (105), obtaining openings (104) passing through the plates (13) themselves, the plates resulting substantially permeable in the transversal direction to the reactant gases.

18 Claims, 3 Drawing Sheets

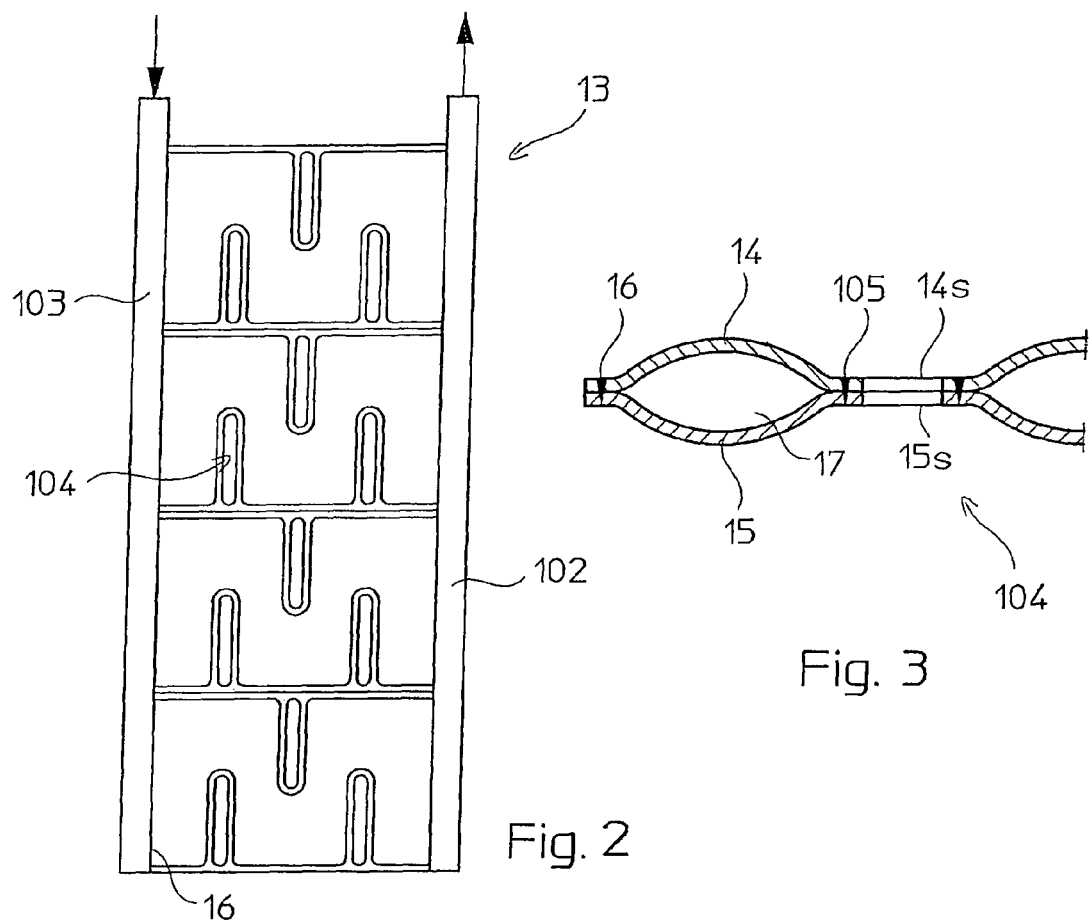
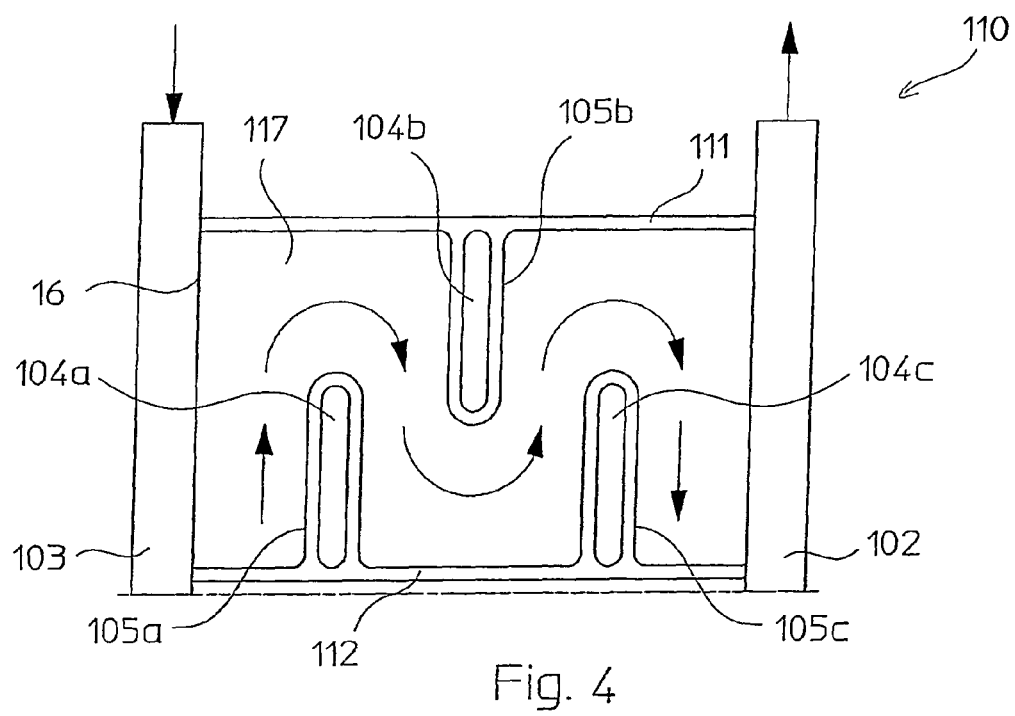

HEAT EXCHANGE UNIT FOR ISOTHERMAL CHEMICAL REACTORS

FIELD OF APPLICATION

In its most general aspect, the invention concerns the technical field of isothermal or pseudo-isothermal reactors for catalytic chemical reactions, that is chemical reactions carried out in the presence of a suitable catalyst and with production of heat (exothermal reactions) or absorption of heat (endothermal reactions).

PRIOR ART

It is known that many catalytic chemical reactions, of the type mentioned above, require to keep the temperature within a somewhat narrow optimal yield range, compensating for the development or absorption of heat caused by the reaction itself.

To this purpose, reactors for catalytic chemical reactions are known that comprise a substantially cylindrical outer shell, equipped with suitable inlets/outlets for the reactants and the reaction products, and containing a catalytic layer in which a heat exchange unit is embedded that is capable of taking heat away from the reactant gases, in the case of exothermal chemical reaction, or vice-versa supplying heat in the case of endothermal chemical reaction. Such reactors are known as "pseudo-isothermal" or, more simply, "isothermal", since the heat exchange unit maintains the temperature in the reactor within a predetermined range, compensating the addition or absorption of heat of the chemical reaction.

The heat exchange unit consists of a plurality of suitably structured, supported and interconnected exchangers, fed with a suitable heat exchange fluid in the form of a liquid, a gas or during a phase change, like a diathermic oil, a molten salt, water in liquid or boiling form, or even the reactant gases themselves. For example, there is a known type of reactor for exothermal reactions wherein a part of the gaseous reactants is circulated inside the heat exchanger, as a cooling fluid, obtaining the further advantage of preheating the reactants themselves.

Plate heat exchangers are widely used in isothermal reactors of the type considered here.

EP-A-1306126, for example, discloses a plate heat exchange unit for a radial or axial-radial isothermal chemical reactor, comprising a plurality of heat exchange plates, arranged substantially radially with long sides parallel to the axis of the unit and short sides extending radially, wherein each plate comprises two juxtaposed and parallel walls, joined by at least one perimetric joint to define a chamber for the circulation of the heat exchange fluid.

It has been found that plated units, despite the advantages such as the large exchange surface, the relatively low cost and the ease of assembly, can produce some disturbance to the external gaseous flow. In particular, the plated unit can create, inside the reaction area, preferential channels for the gaseous flow, between contiguous plates, which are relatively insulated from one another. This effect can reduce the mixing of the flow and the contact between the reactants.

SUMMARY OF THE INVENTION

The problem underlying the invention is to devise and provide a plate heat exchange unit for isothermal chemical reactors, capable of overcoming the aforementioned drawback, reducing the division of the flow in radial channels between the plates.

The problem is solved with a plate heat exchange unit for isothermal chemical reactors, usable for heat exchange between an operative fluid circulating in said unit and a gaseous flow of reactants fed into the reactor, said unit comprising a plurality of heat exchange plates, wherein each plate comprises two juxtaposed and parallel walls, joined by at least one perimetric joint obtaining at least one inner chamber for the circulation of said operative fluid between said walls, characterised in that each plate has a wall equipped with a plurality of openings and the opposite wall is equipped with as many openings facing them, and the plate comprises further joining lines between the walls, along the edges of said openings, obtaining passing-through openings through the plate.

According to a preferred embodiment, the openings are shaped like slits or notches, which extend in the longitudinal direction of extension of the plate. More preferably, said passing-through openings are arranged on a plurality of parallel rows.

It should be noted that each opening, with the relative edge joining line, tends to deviate the fluid circulating inside the plates, with a substantially beneficial effect for the heat exchange. According to a further aspect of the invention, the passing-through openings are arranged on many parallel rows, along each plate, and said parallel rows are preferably staggered obtaining substantially coiled paths of the fluid inside the plate itself, as shall become clear hereafter with a non-limiting example embodiment.

In a preferred embodiment, the plates of the heat exchange unit have a substantially modular structure, comprising a plurality of portions each with respective connections to inlet and outlet manifolds for the heat exchange fluid. The manifolds for feeding and discharging the fluid are advantageously arranged at the sides of the plate, so that each portion (or module) of plate, on its inside, is crossed by the fluid according to a substantially transversal direction.

Preferably, each module of plate comprises a plurality of passing-through openings, made as longitudinal notches or slits, that are parallel and staggered in the longitudinal direction, obtaining a coil-shaped channel for the heat exchange fluid between the two walls.

Preferably, the overall area of the passing-through openings of a plate is between 2% and 20% of the front surface of the same plate (without taking into account possible undulations), more preferably between 5% and 10%. According to an example embodiment, the width of the openings, measured perpendicularly to the longitudinal extension of the plate, is about 15 mm.

An object of the invention is also an isothermal reactor for exothermal or endothermal heterogeneous chemical reactions, provided with a plate heat exchange unit as defined above, embedded in a catalytic layer.

By means of the described passing-through openings, the heat exchange plates, during use, are substantially permeable in the transversal direction to the gaseous flow of reactants. As a result of this the plates do not obstacle the outer gaseous flow, and allow a complete mixing of the reactants. The heat exchange with the fluid inside the plates is also improved by this mixing effect that tends to make the temperature uniform avoiding the formation of more or less hot portions in the gaseous flow. A general improvement in performance of the reactors is thus obtained.

The modular structure of the plates, in accordance with a preferred aspect, makes the heat exchange even more efficient, avoiding the formation of "cold" areas and "hot" areas along the extension of the plates themselves.

Moreover, all of the advantages deriving from the use of plated heat exchangers in isothermal reactors are maintained, such as large exchange surface, low cost and ease of installation.

The characteristics and advantages of the present invention shall become clearer from the following description of a preferred example embodiment, given for indicating and not limiting purposes with reference to the attached figures.

BRIEF DESCRIPTION OF THE FIGURES

FIG. 2 shows a schematised front view of a plate of the heat exchange unit of the reactor of FIG. 1;

FIG. 3 shows an example cross section of a portion of the plate of FIG. 2;

FIG. 4 shows a detail of a portion of the heat exchange plate of FIG. 2, in a front view;

DETAILED DESCRIPTION

Figure 1:
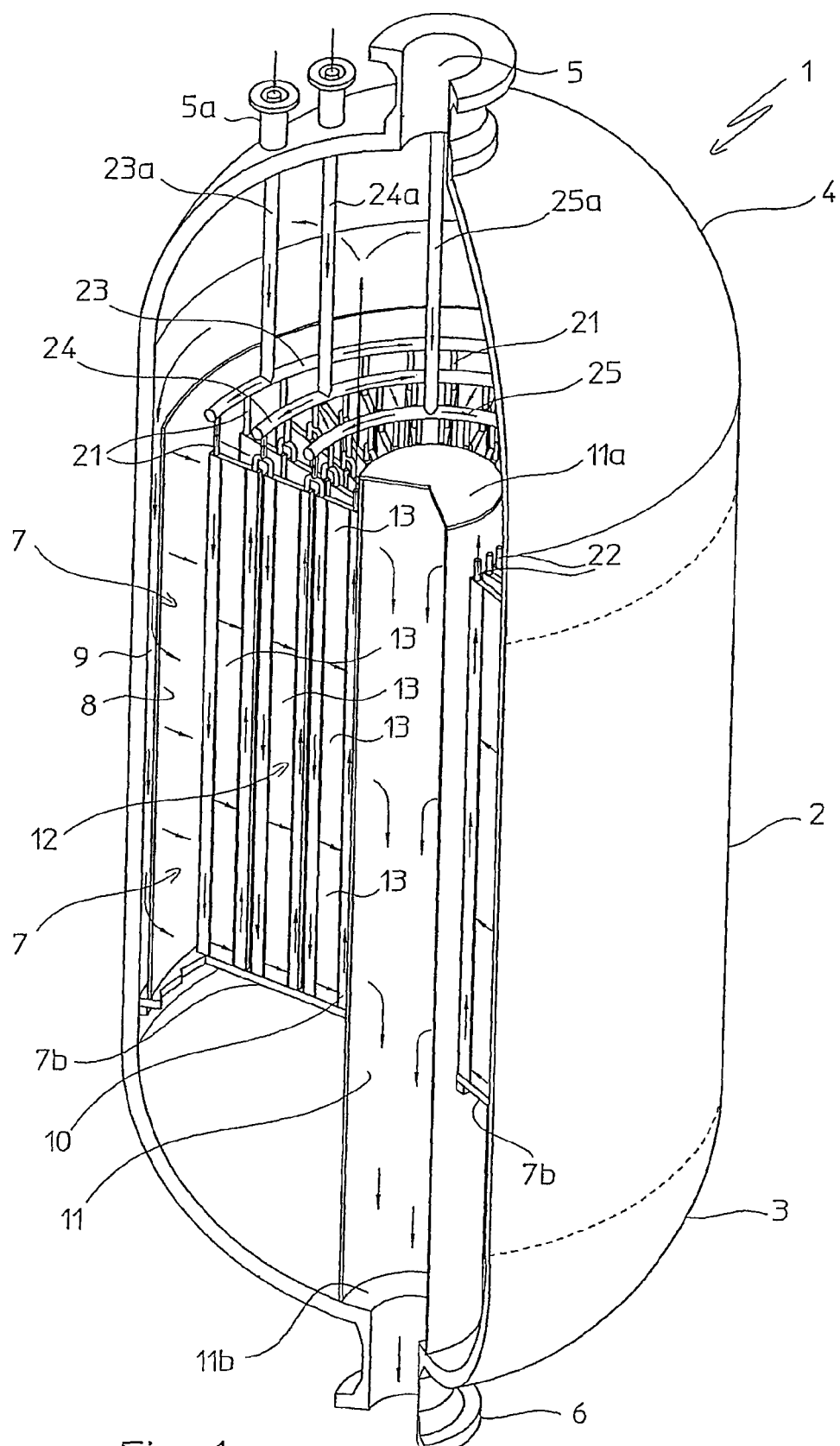
FIG. 1 schematically shows a cut-away of an isothermal reactor with radial flow, comprising a plated heat exchange unit in accordance with a preferred embodiment of the invention.

With reference to FIG. 1, an isothermal reactor 1 is shown that comprises a cylindrical shell 2, with vertical axis, closed by a bottom base plate 3 and by a top base plate 4, equipped with passages 5, 6, for feeding and discharging reactant gases and gaseous reaction products, respectively.

Inside the reactor 1 a reaction area (or environment) is defined, where a catalytic basket 7, substantially cylindrical in shape and having an annular cross section, is supported. Said basket 7 essentially consists of an outer cylindrical wall 8, defining with the shell 2 a low-width gap 9, of an inner cylindrical wall 10 and of an annular base plate 7b.

The inner wall 10 defines an axial passage at the centre, where a duct 11 is generally supported, which constitutes the manifold of the gaseous products of the reaction. Said duct 11 has a closed top end 11a and an open bottom end 11b, in direct fluid communication with the discharge passage 6 of the bottom base plate 3.

The outer wall 8 and the inner wall 10 are perforated to allow the passage of the reactant gases from the gap 9 inside the basket 7, and to allow the passage of the gaseous products of the reaction from the basket 7 to the central duct 11.

The basket 7 is intended to contain a mass of an appropriate catalyst (not represented), in which a heat exchange unit 12, shown schematically in FIG. 1, is immersed and supported, in a per se known way.

Said heat exchange unit 12 has an overall cylindrical annular-shaped construction, similar to that of said basket 7. The unit 12 has an outer diameter substantially equal to the outer diameter of the basket 7, and is crossed axially by a passage having a diameter substantially equal to the inner diameter of the same basket.

In particular, according to a preferred but not limiting embodiment that is schematised in FIG. 1, the heat exchange unit 12 comprises a plurality of heat exchange plates 13, regularly distributed in three coaxial and concentric rows. The plates 13 are arranged substantially radially, with long sides parallel to the axis of the unit 12, and therefore to the axis of the cylindrical shell 2, and short sides extending radially, and are organised in such a way as to constitute a plurality of radial sets of three. Of course, according to different technical-application requirement, each radial set of three plates 13 can be replaced by a pair of plates or by a single plate, sized so as to occupy the entire radial extension of the basket 7.

An operative heat exchange fluid is fed inside the plates 13, to heat or cool (depending on endothermal or exothermal reaction) the reactants. The unit 12, for this purpose, is connected to suitable means for circulating said operative fluid, in the example represented by supply ducts 23a, 24a, 25a and annular distributors 23, 24, 25. These distributors, through a series of connectors 21, feed fluid inlet and outlet manifolds arranged longitudinally at the sides of the plates 13. FIG. 1, for non-limiting purposes, refers to a reactor where the heat exchange fluid, circulating inside the plates 13, consists of the reactants themselves. The reactant gases are fed to the exchange unit 12, where they are preheated by the reaction heat, and then come out into the reaction area from open ducts 22, arranged at the top of the most inner plates 13.

The heat exchange plates 13 have a plurality of passing-through openings, which for the sake of simplicity are not shown in FIG. 1, making them substantially permeable in the transversal direction to the reactant gases.

A plate 13 of the heat exchange unit 12 is shown in greater detail in FIGS. 2 to 5.

In general terms, said plate 13 substantially consists of two facing walls 14 and 15, formed for example from suitably undulating metallic plates, joined together with perimetric welding 16 obtaining a chamber (or a plurality of chambers) 17 for the heat exchange fluid between one wall and the other. The plate 13 is also connected to an inlet manifold for the operative heat exchange fluid and to an outlet manifold for the same fluid, which extend longitudinally at the sides of the plate. Such manifolds 102 and 103 can also be "formed" directly in the plates, as described in EP-A-1306126.

Referring to the example section of FIG. 3, the wall 14 has a plurality of openings 14s, whereas the wall 15 has a plurality of respective and juxtaposed openings 15s. Along the edges of said openings 14s and 15s a joining line 105 is made, for example a welding, obtaining one of the passing-through openings 104. It is understood that openings 14s and 15s and the respective welding 105 define said passing-through opening 104 across the plate 13, without interrupting the fluid seal of the internal chamber 17.

The plate 13 is equipped with a plurality of these openings 104, preferably arranged, like in the figure, over many parallel rows or series. In the illustrated example, the openings 104 are arranged over three parallel rows, the central row being staggered with respect to the side rows.

By means of these passing-through openings 104, the plate 13 is substantially permeable to the outer flow of gaseous reactants, i.e. it can be crossed also transversally by the reactants themselves that flow radially, in the way described above, inside the reactor 1.

The plate 13, in a preferred embodiment, has a substantially modular structure, comprising a plurality of portions (or modules), each module having respective connections, made with a per se known technique, to the fluid inlet and outlet manifolds.

Figure 5:
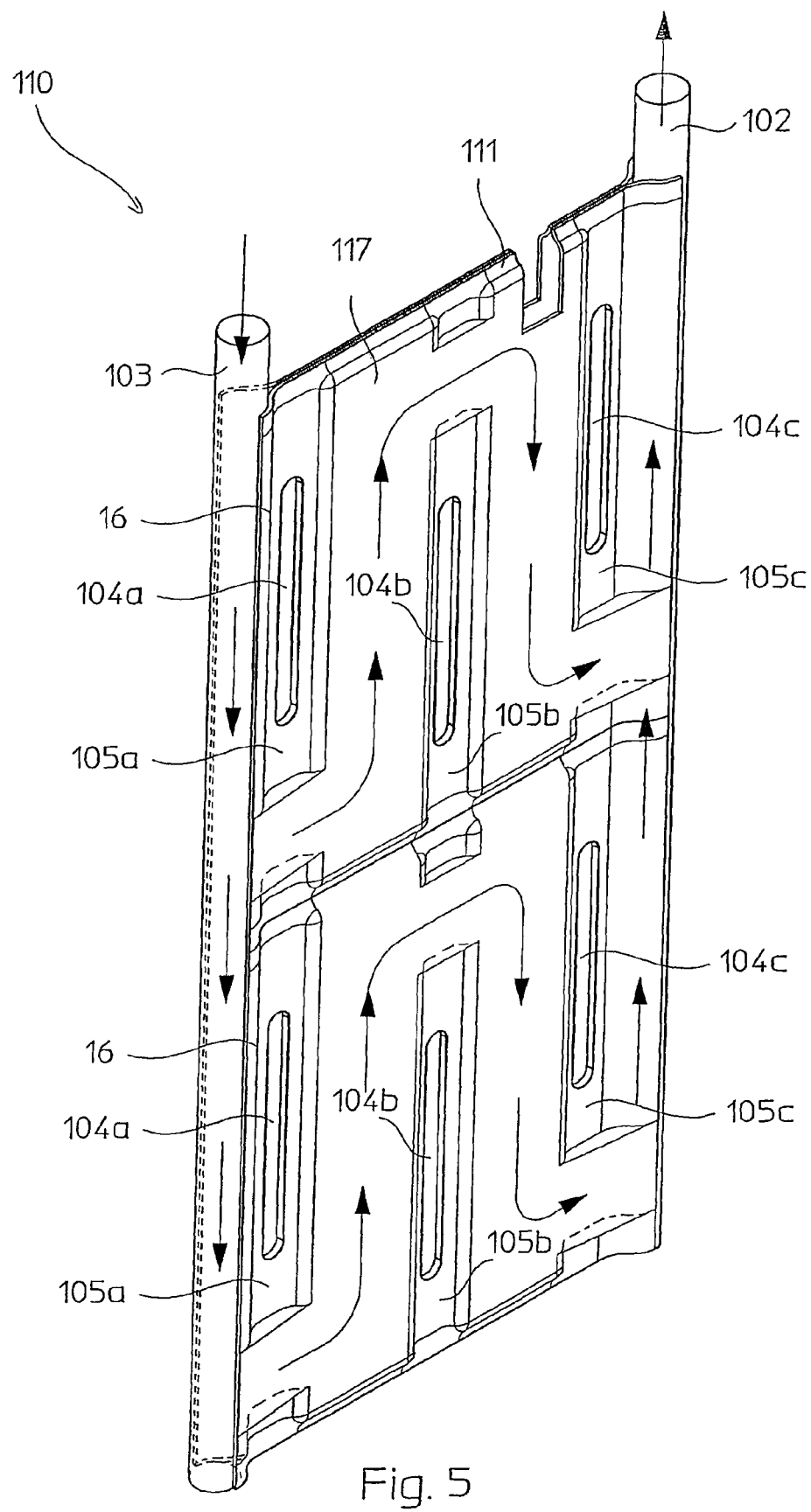
FIG. 5 represents a perspective view of a portion of plate of the heat exchange unit of FIG. 1.

Referring to FIGS. 4-5, one of these modules of the plate 13 is indicated as 110.

Said module 110 is defined and separated from the adjacent modules by welds 111 and 112 between the walls 14, 15, and defines a chamber or duct for the circulation of the fluid in suitable communication with the manifolds 103 and 102. The module 110 is crossed transversally by the heat exchange fluid, with a coil-shaped path shown as an example by the arrows of FIGS. 4 and 5.

In greater detail, the plate module 110 has three passing-through openings or notches 104a, 104b and 104c, made as described above and extending in the longitudinal direction. The notches are substantially parallel and staggered apart in the longitudinal direction, defining a substantially coil-shaped transversal channel 117. Each notch 104a-104c is surrounded by a respective edge weld 105a-105c, which maintains the fluid-tight seal of the channel 117 between the walls 14 and 15 of the plate 13.

The edge welds 105a-105c are continuous, alternatively, with the top weld 111 or with the bottom weld 112 for closing the module 110. In the example, welds 105a-105c are continuous with the bottom weld 112, which defines the module 110 at the bottom, whereas weld 105b is continuous with the opposite top weld 111, giving rise to the staggered arrangement of the openings 104a-104c.

It should be noted that each module of the plate 13, analogous to the module 110 of FIG. 4, has a respective channel or duct for the operative fluid, analogous to the substantially transversal and coil-shaped channel 117, separated from the channels of the adjacent modules. In equivalent embodiments, however, channels defined in the various plate modules can also be in fluid communication with each other.

The fluid passages between the manifolds 103, 102 and the channels of the plates are made with a per se known technique, for example interruption of the welds between the walls of the plate or suitable sleeves.

The operation is as follows. With reference to FIG. 1, the reactant gases are fed, through the described ducts and annular distributors, to the plates 13. These gases come out from the ducts 22 of the most inner plates, in the space defined by the top base plate 4, and thus cross the reaction area radially from the gap 9 to the manifold 11. The heat exchange in the unit 12, referring to exothermal reaction, cools down the catalytic bed and the reaction products and preheats the flow of reactants. Due to the presence of the openings 104 in the plates 13, a transversal mixing flow of the reactant gases is obtained, through the plates themselves, along the radial path in the reactor 1, with benefits in terms of yield of the chemical reaction and overall amount of heat exchanged by the unit 12, as well as maintaining the desired temperature profile.

Finally, it should be noted that the application of the invention should not be considered to be limited to radial or axial-radial reactors, but equally advantageous also in isothermal chemical reactors of other types.

The invention claimed is:

1. A plate heat exchange unit for an isothermal chemical reactor, usable for heat exchange between an operative fluid circulating in said unit and a gaseous flow of reactants fed into the reactor, said unit comprising:
   a plurality of heat exchange plates, wherein each plate comprises two juxtaposed and parallel walls, joined by at least one perimetric joint obtaining at least one internal chamber for the circulation of said operative fluid between said walls,
   wherein each plate has a wall equipped with a plurality of openings and the opposite wall is equipped with as many openings facing them, and the plate comprises further joining lines between the walls along the edges of said openings, obtaining passing-through openings through said plate,
   wherein said passing-through openings through the plates extend in the longitudinal direction of extension of the plates themselves,
   wherein said passing-through openings are arranged on a plurality of parallel rows, and
   wherein the parallel rows of through openings of each plate are staggered obtaining substantially coil-shaped paths of the fluid in the chamber inside the plates.

2. The heat exchange unit according to claim 1, wherein each heat exchange plate has a substantially modular structure, comprising a plurality of portions or modules, each module having respective inlet and outlet connections for the operative heat exchange fluid.

3. The heat exchange unit according to claim 1, wherein the walls of said plates are made of metal, and said joining lines between the walls are made through welding lines of the walls.

4. The heat exchange unit according to claim 1, wherein the unit has a substantially annular and cylindrical configuration, with the heat exchange plates arranged radially.

5. A plate heat exchange unit for an isothermal chemical reactor, usable for heat exchange between an operative fluid circulating in said unit and a gaseous flow of reactants fed into the reactor, said unit comprising:
   a plurality of heat exchange plates, wherein each plate comprises two juxtaposed and parallel walls, joined by at least one perimetric joint obtaining at least one internal chamber for the circulation of said operative fluid between said walls,
   wherein each plate has a wall equipped with a plurality of openings and the opposite wall is equipped with as many openings facing them, and the plate comprises further joining lines between the walls along the edges of said openings, obtaining passing-through openings through said plate,
   wherein said passing-through openings through the plates extend in the longitudinal direction of extension of the plates themselves,
   wherein each heat exchange plate has a substantially modular structure, comprising a plurality of portions or modules each module having respective inlet and outlet connections for the operative heat exchange fluid, and
   wherein each plate module comprises a plurality of said passing-through openings, arranged to define a substantially coil-shaped channel for the heat exchange fluid inside the plate module.

6. The heat exchange unit according to claim 5, wherein each module has lateral passing-through openings and a central opening staggered with respect to the lateral ones, so that the overall plate has three rows or series of passing-through openings, the central row being staggered with respect to the lateral ones.

7. The heat exchange unit according to claim 5, wherein the walls of said plates are made of metal, and said joining lines between the walls are made through welding lines of the walls.

8. The heat exchange unit according to claim 5, wherein the unit has a substantially annular and cylindrical configuration, with the heat exchange plates arranged radially.

9. A plate heat exchange unit for an isothermal chemical reactor, usable for heat exchange between an operative fluid circulating in said unit and a gaseous flow of reactants fed into the reactor, said unit comprising:
   a plurality of heat exchange plates, wherein each plate comprises two juxtaposed and parallel walls, joined by at least one perimetric joint obtaining at least one internal chamber for the circulation of said operative fluid between said walls,
   wherein each plate has a wall equipped with a plurality of openings the opposite wall is equipped with as many openings facing them, and the plate comprises further joining lines between the walls along the edges of said openings, obtaining passing-through openings through said plate, wherein said passing-through openings through the plates extend in the longitudinal direction of extension of the plates themselves, wherein each heat exchange plate has a substantially modular structure, comprising a plurality of portions or modules, each module having respective inlet and outlet connections for the operative heat exchange fluid, and wherein each plate module is defined by a top joining line and by an opposite bottom joining line between the walls of the plate, and said passing-through openings are surrounded by joining lines alternatively continuous with said top joining line and said bottom joining line.

10. The heat exchange unit according to claim 9, wherein the walls of said plates are made of metal, and said joining lines between the walls are made through welding lines of the walls.

11. The heat exchange unit according to claim 9, wherein the unit has a substantially annular and cylindrical configuration, with the heat exchange plates arranged radially.

12. A plate heat exchange unit for an isothermal chemical reactor, usable for heat exchange between an operative fluid circulating in said unit and a gaseous flow of reactants fed into the reactor, said unit comprising:

a plurality of heat exchange plates, wherein each plate comprises two juxtaposed and parallel walls, joined by at least one perimetric joint obtaining at least one internal chamber for the circulation of said operative fluid between said walls, wherein each plate has a wall equipped with a plurality of openings and the opposite wall is equipped with as many openings facing them, and the plate comprises further joining lines between the walls along the edges of said openings, obtaining passing-through openings through said plate, and wherein said passing-through openings through the plates extend in the longitudinal direction of extension of the plates themselves, and wherein the overall area of the passing-through openings of each plate is between 2% and 20% of the front surface of the plate itself.

13. The heat exchange unit according to claim 12, wherein the overall area of the passing-through openings of each plate is between 5% and 10% of the front surface of the plate itself.

14. The heat exchange unit according to claim 12, wherein the walls of said plates are made of metal, and said joining lines between the walls are made through welding lines of the walls.

15. The heat exchange unit according to claim 12, wherein the unit has a substantially annular and cylindrical configuration, with the heat exchange plates arranged radially.

16. A plate heat exchange unit for an isothermal chemical reactor, usable for heat exchange between an operative fluid circulating in said unit and a gaseous flow of reactants fed into the reactor, said unit comprising:

a plurality of heat exchange plates, wherein each plate comprises two juxtaposed and parallel walls, joined by at least one perimetric joint obtaining at least one internal chamber for the circulation of said operative fluid between said walls, wherein each plate has a wall equipped with a plurality of openings and the opposite wall is equipped with as many openings facing them, and the plate comprises further joining lines between the walls along the edges of said openings, obtaining passing-through openings through said plate, and wherein said passing-through openings through the plates extend in the longitudinal direction of extension of the plates themselves, and wherein the passing-through openings of the plates have a width of about 15 mm.

17. The heat exchange unit according to claim 16, wherein the walls of said plates are made of metal, and said joining lines between the walls are made through welding lines of the walls.

18. The heat exchange unit according to claim 16, wherein the unit has a substantially annular and cylindrical configuration, with the heat exchange plates arranged radially.

* * * * *